United States Patent [19]

Hammond

[11] Patent Number: 5,018,160

[45] Date of Patent: May 21, 1991

[54] DYE SYSTEM FOR DYE LASER APPLICATIONS

[75] Inventor: Peter R. Hammond, Livermore, Calif.

[73] Assignee: The United States of America as represented by the United States Department of Energy, Washington, D.C.

[21] Appl. No.: 564,240

[22] Filed: Aug. 8, 1990

[51] Int. Cl.$^5$ ............................................. H01S 3/20
[52] U.S. Cl. ..................................... 372/53; 372/69; 252/301.17
[58] Field of Search ............................ 372/53, 54, 69; 252/301.17

[56] References Cited

U.S. PATENT DOCUMENTS 4,896,329  1/1990  Knaak ................................. 372/53

*Primary Examiner*—Léon Scott, Jr.
*Attorney, Agent, or Firm*—Miguel A. Valdes; Roger S. Gaither; William R. Moser

[57] ABSTRACT

A dye of the DCM family, [2-methyl-6-[2-(1,2,3,4-tetrahydro-1-methyl-6-quinolinyl)ethenyl]-4H-pyran-4-ylidene]-propanedinitrile, dissolved in 2-phenoxyethanol, is non-mutagenic, stable and efficient, particularly in a pumped continuous wave laser system.

2 Claims, No Drawings

DYE SYSTEM FOR DYE LASER APPLICATIONS

FIELD OF THE INVENTION

The present invention is directed to improving the long term performance and stability of a dye laser.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The dye DCM, [2-[2-[4-(dimethylamino)phenyl]ethenyl]-6-methyl-4H-pyran-4-ylidene]propanedini advantageous for use in certain dye lasers, particularly for argon laser pumped continuous wave operation in the deep red. Such dye lasers typically employ a jet stream of the dye in a viscous solvent such as ethylene glycol as a component of the laser cavity. The dye DCM, however, dissolved in a mixture of benzyl alcohol and ethylene glycol (typically 40:60 volume:volume ratio) has initial acceptable laser performance, but it quickly degrades over several days, even if the laser is not running. The degradation is caused by precipitation of the dye on filters, requiring the dye solution to be changed relatively often. Moreover, since ethylene glycol is hygroscopic, the composition of the dye solution changes since ethylene glycol gains as much as 15% of its own weight in water from the atmosphere within a few days. From a safety point of view, DCM is a known, strong mutagen, and hence it is suspected to be a carcinogen.

Therefore, there is a need for developing improved dye systems to obviate some or all of these problems with the DCM/benzyl alcohol/ethylene glycol dye system.

SUMMARY OF THE INVENTION

The present invention provides a method for producing energy in a dye laser, comprising the step of exciting a solution comprising the dye [2-methyl-6-[2-(1, 2,3,4-tetrahydro-1-methyl-6-quinolinyl)ethenyl]-4H-pyran-4-ylidene]-propanedinitrile in phenoxyethanol with energy sufficient to cause the dye to lase.

Briefly, the present invention provides a dye laser system comprising the dye [2-methyl-6-[2-(1,2,3,4-tetrahydro-1-methyl-6-quinolinyl)ethenyl]-4H-pyran-4-ylidene]propanedinitrile in phenyoxyethanol as a solvent, which has dye laser performance similar to DCM in ethylene glycol/benzyl alcohol, but with improved long term performance, stability and safety. A method for making the dye, termed D15 for convenience herein, is also provided.

Additional objects, advantages and novel features of the invention will be set forth in the description that follows and, in part, will be apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

The dye utilized in the method according to the present invention is of the following formula:

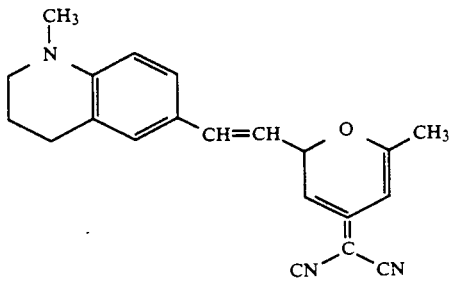

It may be dissolved in phenoxyethanol with slight warming, provides stable solutions, and is not mutagenic. 2-Phenoxyethanol is preferably used in its purest commercial form, that is 98% pure material. The solvent itself is a bactericide and insect repellant and has a known, but mild toxicology ($LD_{50}$ for oral dosages to rats of 1.26 grams/ kilogram body weight). It is characterized by relatively low volatility, and low flammability; has an nd of 1.54; a boiling point of 237.C and a flash point of 230° F. It has a steeper refractive index gradient and lower thermal capacity than ethylene glycol.

The dye D15 may be readily prepared by condensing 1,2,3,4-tetrahydro-1-methyl-6-quinolinecarboxaldehyde and (2,6-dimethyl-4-pyran-4-ylidene)-propanedinitrile in pyridine with a piperidine catalyst. The dye D15 precipitates along with the starting material, the substituted propanedinitrile, and may be purified by extraction with boiling methanol (in which this second component is soluble).

In a typical preparation, 51.6 grams of the propanedinitrile (0.3 moles) and 66 grams (0.375 moles) of the quinolinecarboxaldehyde are refluxed in pyridine (500 ml) containing piperidine (0.9 ml), acetic acid (0.3 ml) and bumping stone for about 30 minutes. The cooled reactants are poured into a stirred ice (1 kg), water (2.0 L) suspension and the whole mixture is stirred for 15 minutes. The desired dye D15 and the unchanged starting material, the substituted propanedinitrile precipitates are filtered off, washed twice with cold methanol and allowed to dry. The reaction products can be monitored by thin layer chromatography on alumina (eluting with isopropyl ether). The desired dye D15 has an $R_f$ of 0.50 appearing as a red brown spot with red fluorescence under UV light. The substituted propanedinitrile has an $R_f$ of 0.40, seen by ultraviolet absorption. A slight amount of the dicondensation product may be present as a deep red spot at $R_f$ of 0.30. The precipitated product may be stirred and refluxed in methanol (about 900 mls) for about 10 minutes and the hot settled solution may be decanted through filter paper. By extraction several times (usually about 6) with diminishing quantities of methanol, the D15 dye may be isolated, dried, weighed and analyzed. From the above quantity of starting materials an 8.6 gram sample is obtained containing 10–20% of the substituted propanedinitrile impurity, which on crystallization from benzene (300 ml) yields 6.7 grams of the pure dye D15. Drying at 60° for 2 hours at 1 mm pressure produces a solid product having a melting point of 246°–248° with the following analysis and NMR spectrum: C 76.4, H 6.0, N 12.1%. $C_{21}H_{19}N_3O$ requires C 76.6, H 5.8, N 12.8%. NMR (deuterodimethylsulfoxide): δ 7.45-6.55, complicated multiplet, 7H, resolved by comparison with the DCM spectrum as follows: 7.37 and 6.95 (q, 2H, resolved as AB quartet, J=15.8 Hz, trans-ethylene); 7.33 and 6.57 (q, 1H plus d, 1H, resolved as AB quartet, J=8.4 Hz, aromatic ring protons C-7 and C-8; with extra splitting of the low field portion, J=2.4 Hz, coupling of the aromatic C-7 and C-5 protons); 7.29 (d, 1H, J=2.4 Hz, aromatic C-5 proton); 6.69 and 6.57 (d, 1H plus q, 1H, resolved as AB quartet, J=2.1 Hz, pyran ring protons; with extra splitting of the high field portion, J=0.8 Hz, coupling with neighboring $CH_3$). 3.32 (t, 2H, J=8.0 Hz, $CH_2$-N); 2.93 (s, 3H, $CH_3$-N); 2.70 (t, 2H, J=6.4 Hz, CH2-Ar); 2.42 (s, 3H, CH3-CO); 1.88 (q, 2H, J=5.9 Hz, CH2-CH2-CH2).

The performance of the dye D15 may be examined using an argon ion laser pump and a conventional dye laser cavity.

EXAMPLE

Experiments were conducted on a Coherent Model 699-21 stabilized ring dye laser with the pump laser used being a Spectra Physics Model 171 argon ion laser operated on all lines. Data was gathered from an open cavity with no tuning elements in the dye laser cavity. For broadband data only the birefringent filter was used. Single frequency operation tests were conducted using all tuning elements (birefringent filter, intracavity etalon assembly and scanning Brewster plate) with the laser peaked for minimum line width. All the tuning curves can be determined with the laser in a single frequency operation for power and wavelength stability. The optics were optimized for a tuning range of 610–725 nm. Two solutions were compared on this conventional apparatus: 1 gram of DCM dissolved in 400 ml of benzyl alcohol (with the aid of about 45 minutes of sonication) and 600 ml of ethylene glycol. The D15, 1.1 grams, was sonicated in a liter of phenoxyethanol for about 30 minutes. Both solutions exhibited 93% absorption of the pump beams. With respect to long term performance the D15/phenoxyethanol exceeded the DCM/ethylene glycol/benzyl alcohol system. The D15 system lased for 104 hours (6 watt pump; 624 watt hours/liter) and retained better than 90% output. Also less day-to-day adjustment was needed to maintain single frequency power for the D15/phenoxyethanol system.

The foregoing description of the preferred embodiments of the invention are presented for purposes of illustration and description. It is not intended to be exhaustive nor to limit the invention to the precise form disclosed, and obviously many modifications and variations are possible in light of the above teachings. The embodiments were chosen for description only to best explain the principles of the invention at its practical application, thereby enabling others skilled in the art to best utilize the invention and its various embodiments, and with various modifications as are suited to the particular use contemplated. It is thus intended that the scope of the invention be defined by the claims appended hereto.

What is claimed is:

1. In a method for producing energy by a dye laser, the improvement comprising the step of pumping a solution comprising the dye [2-methyl-6-[2-(1,2,3,4-tetrahydr-1-methyl-6-quinolinyl)ethenyl]-4H-pyran-4-ylidene -propanedinitrile dissolved in 2-phenoxyethanol with energy sufficient to cause said dye solution to lase.

2. A method according to claim 1 wherein said energy to cause said dye to lase is provided by an argon ion laser.

* * * * *